United States Patent
Tirumalai et al.

(10) Patent No.: US 7,458,067 B1
(45) Date of Patent: Nov. 25, 2008

(54) METHOD AND APPARATUS FOR OPTIMIZING COMPUTER PROGRAM PERFORMANCE USING STEERED EXECUTION

(75) Inventors: Partha P. Tirumalai, Fremont, CA (US); Spiros Kalogeropulos, Los Gatos, CA (US); Yonghong Song, South San Francisco, CA (US); Kurt J. Goebel, Dayton, OH (US)

(73) Assignee: Sun Microsystems, Inc., Santa Clara, CA (US)

( * ) Notice: Subject to any disclaimer, the term of this patent is extended or adjusted under 35 U.S.C. 154(b) by 583 days.

(21) Appl. No.: 11/084,656

(22) Filed: Mar. 18, 2005

(51) Int. Cl.
G06F 9/44 (2006.01)
(52) U.S. Cl. ..................... 717/140; 717/151
(58) Field of Classification Search .......... 717/140, 717/151
See application file for complete search history.

(56) References Cited

U.S. PATENT DOCUMENTS

| | | | |
|---|---|---|---|
| 6,079,032 A * | 6/2000 | Peri | 714/38 |
| 6,708,332 B2 * | 3/2004 | Murphy et al. | 717/168 |
| 7,210,126 B2 * | 4/2007 | Ghobrial et al. | 717/127 |
| 2002/0144244 A1 * | 10/2002 | Krishnaiyer et al. | 717/140 |
| 2003/0101443 A1 * | 5/2003 | Kosche et al. | 717/158 |

* cited by examiner

Primary Examiner—Wei Y. Zhen
Assistant Examiner—Junchun Wu
(74) Attorney, Agent, or Firm—Park, Vaughan & Fleming LLP; Edward J. Grundler

(57) ABSTRACT

One embodiment of the present invention provides a system that facilitates optimizing computer program performance by using steered execution. The system operates by first receiving source code for a computer program, and then compiling a portion of this source code with a first set of optimizations to generate a first compiled portion. The system also compiles the same portion of the source code with a second set of optimizations to generate a second compiled portion. Remaining source code is compiled to generate a third compiled portion. Additionally, a rule is generated for selecting between the first compiled portion and the second compiled portion. Finally, the first compiled portion, the second compiled portion, the third compiled portion, and the rule are combined into an executable output file.

13 Claims, 5 Drawing Sheets

METHOD AND APPARATUS FOR OPTIMIZING COMPUTER PROGRAM PERFORMANCE USING STEERED EXECUTION

BACKGROUND

1. Field of the Invention

The present invention relates to compilers for computer programs. More specifically, the present invention relates to a method and an apparatus for optimizing computer program performance using steered execution between alternate versions of the same portion of code that are optimized in different ways.

2. Related Art

Advanced compilers typically include an optimizer, which implements several different types of optimizations. While generating executable code, these optimizing compilers attempt to judiciously apply these optimizations to generate optimized code for a target system. In practice, there is a significant diversity in the characteristics of programs to be compiled. Furthermore, the class of machines that a commercial compiler has to target is also quite large. This creates problems as to which optimizations should be applied (and/or how they should be applied) for a given program with different inputs on a given target system.

Some compiler optimizations are so universal that that they are likely to benefit all programs. These optimizations can be applied without any concern. However, many advanced optimizations have the characteristic that they benefit some programs but can hurt others. A number of approaches have been used to help compilers apply such optimizations. These approaches are described as follows.

Static analysis: The compiler analyzes the input program and the target machine model and decides whether a given optimization will be beneficial.

Profile feedback: The program is run using training input data and response data is collected. The program is then re-compiled along with the collected data. Using the profile feedback data, the compiler attempts to decide whether an optimization will be useful.

Just-in-time compilation: The compiler runs alongside the program and attempts to optimally compile the program as it executes.

All three approaches have problems associated with them. Static analysis is difficult and it is often not possible to decide whether an optimization should or should not be applied. Indeed, this is the main reason the other two techniques were developed.

Profile feedback is useful, but it has the problem that it requires effort on the part of the user. Most users today do not use profile feedback and the technique has largely been employed in vendor-sponsored benchmarking. Furthermore the compile-run-recompile loop can significantly impact build time. Additionally, the task of selecting one or a few inputs to represent all possible executions of a program is not easy.

Just-in-time compilation has become popular, especially with the advent of the Java™ programming language. The main difficulty with just-in-time (JIT) compilers is that compilation, especially advanced optimization, is a complex task that needs significant computational resources. Furthermore, JIT compilation competes for the same system resources as the program it is trying to optimize. Therefore, most JIT compilers today avoid sophisticated optimizations, and the quality of JIT compiler generated code, while better than running an interpreter, is well behind that of an advanced static compiler.

Hence, what is needed is a method and an apparatus for optimizing computer program performance without the above described problems.

SUMMARY

One embodiment of the present invention provides a system that facilitates optimizing computer program performance by using steered execution. The system operates by first receiving source code for a computer program, and then compiling a portion of this source code with a first set of optimizations to generate a first compiled portion. The system also compiles the same portion of the source code with a second set of optimizations to generate a second compiled portion. Remaining source code is compiled to generate a third compiled portion. Additionally, a rule is generated for selecting between the first compiled portion and the second compiled portion. Finally, the first compiled portion, the second compiled portion, the third compiled portion, and the rule are combined into an executable output file.

In a variation of this embodiment, during execution of the executable output file, the system steers execution between the first compiled portion and the second compiled portion based upon the rule.

In a further variation, the system monitors an execution parameter during execution of the executable output file, and steers execution between the first compiled portion and the second compiled portion based upon monitored value of the execution parameter.

In a further variation, the execution parameter can include the number of clock cycles used; the instruction count; the number of cache misses; and the number of branch mispredictions.

In a further variation, the first set of optimizations includes optimizations for cache misses, and the second set of optimizations includes optimizations for cache hits.

In a further variation, the system monitors cache misses and cache hits, and steers execution between the first compiled portion and the second compiled portion based upon the number of cache misses and the number of cache hits.

In a further variation, the rule steers between code that is optimized for instruction prefetches and code that is optimized for no instruction prefetches; software pipelining and no software pipelining; if-conversions and no if-conversions; and code in-lining and no code in-lining.

DETAILED DESCRIPTION

Figure 1:
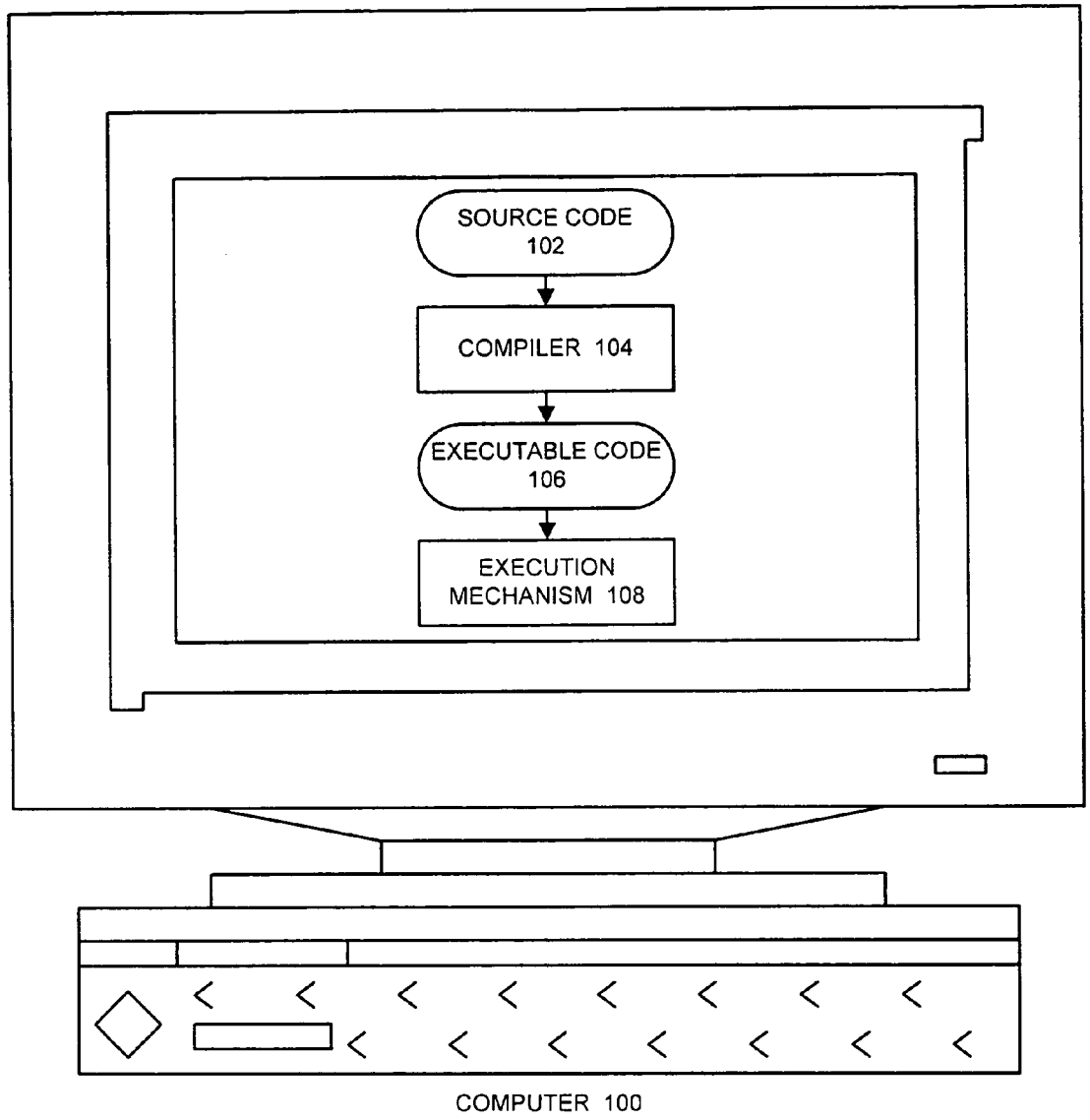
FIG. 1 illustrates a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Overview

One embodiment of the present invention uses an advanced static compiler to optimize a program. Whenever the compiler reaches a point where it cannot decide whether to apply an optimization, it simply emits both optimized and unoptimized versions of executable code, along with a rule or a gate above both versions. At the same time, the compiler also emits control codes for use by a separate run-time agent.

In one embodiment of the present invention, the run-time agent is a lightweight monitoring entity that watches a few execution characteristics (e.g. cycles, instruction count, and cache misses in an initial implementation). The agent then uses a sampling technique to gather histograms of these basic characteristics over the program's execution. These control codes are simple rules for looking up the histogram being collected by the run-time agent and deciding how to steer execution at the controlled gate.

The following example illustrates the salient features of this idea. When compiling the function "test,"

```
void test(int *a, int *b, int *c, int *d, int n) {
  int i;
  for (i = 0; i < n; i++) {
    a[i] = b[i] + c[i] +d[i];
  }
}
``` the compiler does not have enough compile-time information to decide if prefetches are needed for the loop within the function "test". In currently existing compilers, the compiler generates four prefetches for the memory accesses a[i], b[i], c[i], d[i], which will help only if there are cache misses, but will slow down the loop if there are no cache misses. The approach in the present invention is to have the compiler will transform the function "test" into:

```
int cache_misses;
void test(int *a, int *b, int *c, int *d, int n) {
  int i;
  if (cache_misses) {
    /* the compiler will introduce four prefetches */
    for (i = 0; i < n; i++) {
      a[i] = b[i] + c[i] +d[i];
    }
  } else {
    /* the compiler will introduce four prefetches */
    for (i = 0; i < n; i++) {
      a[i] = b[i] + c[i] +d[i];
    }
  }
}
``` where "cache_misses" is the gate and the run-time agent sets the value of cache_misses to 1 or 0.

In this approach, all the hard computationally intensive tasks, such as code transformations, data flow analysis, scheduling, register allocation, etc., which are typically done during compilation are actually done statically. The lightweight run-time agent merely steers execution down the optimal paths. Thus, this embodiment of the present invention solves both the problem of not knowing what to do at compile time and the headache of expensive optimization at execution time.

Computer System

FIG. 1 illustrates a computer system 100 in accordance with an embodiment of the present invention. Computer system 100 includes compiler 104 and execution mechanism 106.

During operation, compiler 104 compiles source code 102 into executable code 106 as described below in conjunction with FIGS. 2 and 5 below. Execution mechanism 106 then executes executable code 108 as described below in conjunction with FIGS. 3, 4, and 6.

Compiler

Figure 2:
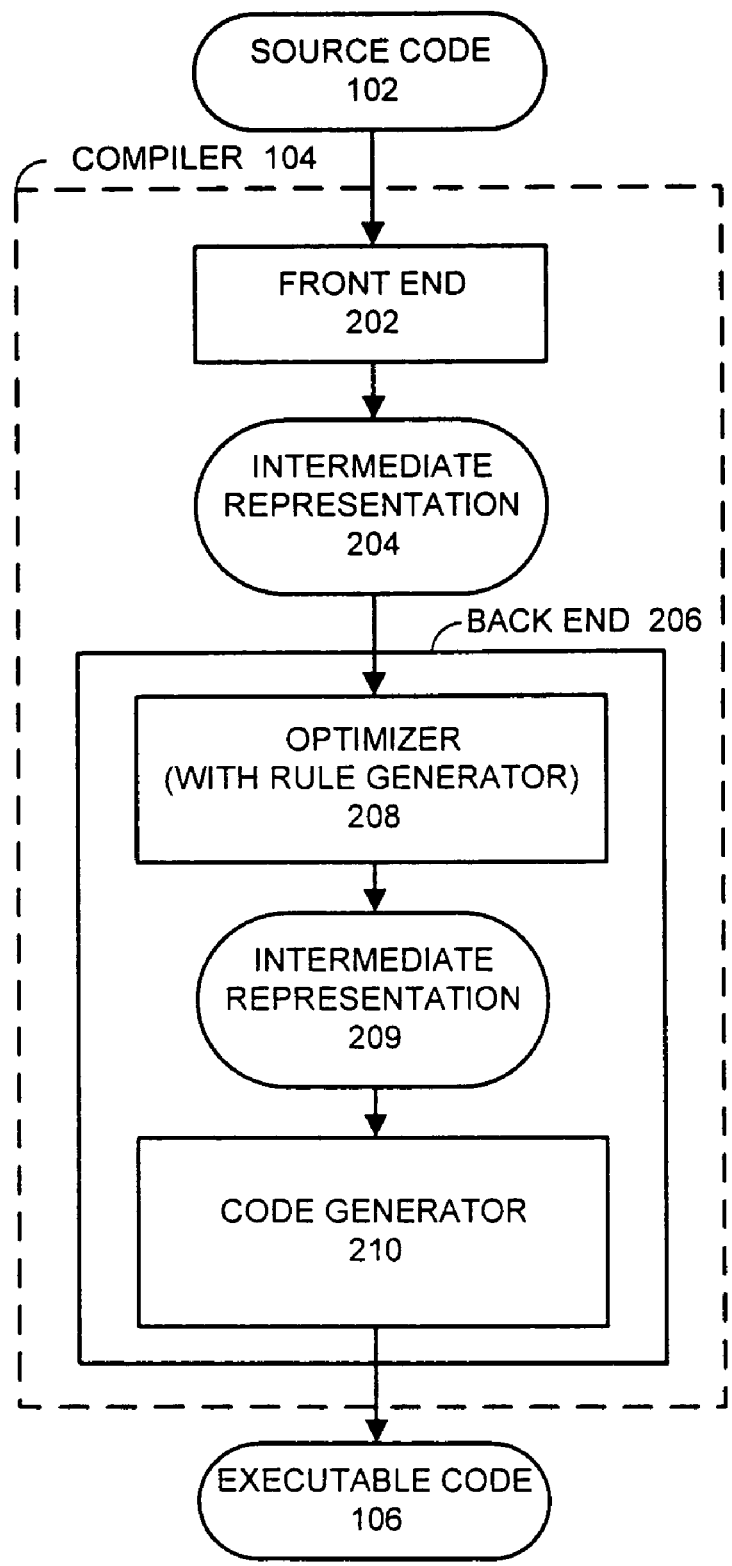
FIG. 2 illustrates a compiler in accordance with an embodiment of the present invention.

FIG. 2 illustrates a compiler 104 in accordance with an embodiment of the present invention. Compiler 104 includes front end 202 and back end 206. Code generator 202 and optimization mechanism 204 operate in concert to generate executable code 106 from the source code 102. Front end 202 generates intermediate representation 204 from source code 102.

Back end 206 includes optimizer (with rule generator) 208 and code generator 210. Optimizer 208 accepts intermediate representation 204, and generates intermediate representation 209. Code generator 210 then generates executable code 106 from intermediate representation 209.

Optimizer generates two streams of optimized code for some portions of intermediate representation 204 and generates a rule for use by code execution mechanism 106 to select one of the optimized streams of code during code execution. This operation is described in more detail below in conjunction with FIG. 3.

Code Execution Mechanism

Figure 3:
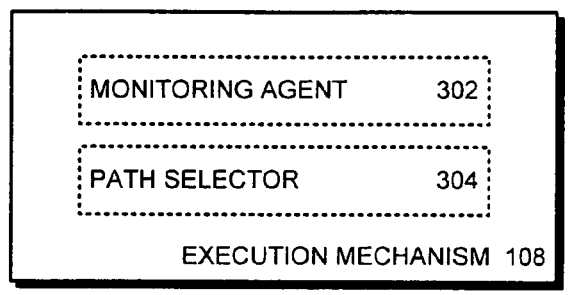
FIG. 3 illustrates a code execution mechanism in accordance with an embodiment of the present invention.

FIG. 3 illustrates a code execution mechanism 106 in accordance with an embodiment of the present invention. Execution mechanism 106 includes monitor agent 302 and path selector 304. Monitor agent 302 monitors the execution of the compiled code and establishes values for parameters, such as instruction prefetch statistics, software pipelining statistics, if-conversion statistics, and code in-lining statistics to set a binary value. The monitored parameters can include various run-time statistics, such as the number of clock cycles used, the instruction count, the number of cache misses, or the number of branch mispredictions.

Based upon the established values and the rules generated by rule generator 206, monitor agent 302 establishes a binary value that is used by path selector 304. Path selector 304 uses this binary value to direct a software switch as described below in conjunction with FIG. 4.

Code Execution Path

Figure 4:
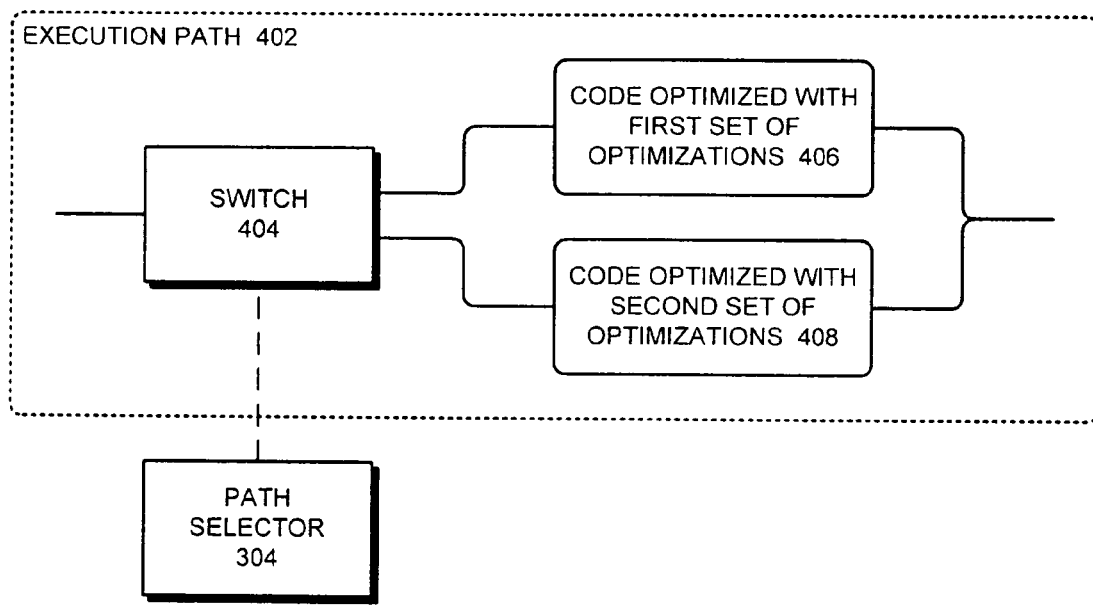
FIG. 4 illustrates an execution path in accordance with an embodiment of the present invention.

FIG. 4 illustrates an execution path 402 in accordance with an embodiment of the present invention. Execution path 402 proceeds generally from left to right. Path selector 304 controls switch 404 to direct execution to either the code optimized with the first set of optimizations 406 or the code optimized with the second set of optimizations 408. The execution path 402 is switched based upon the binary value generated by monitor agent 302.

Optimizing Compiled Code

Figure 5:
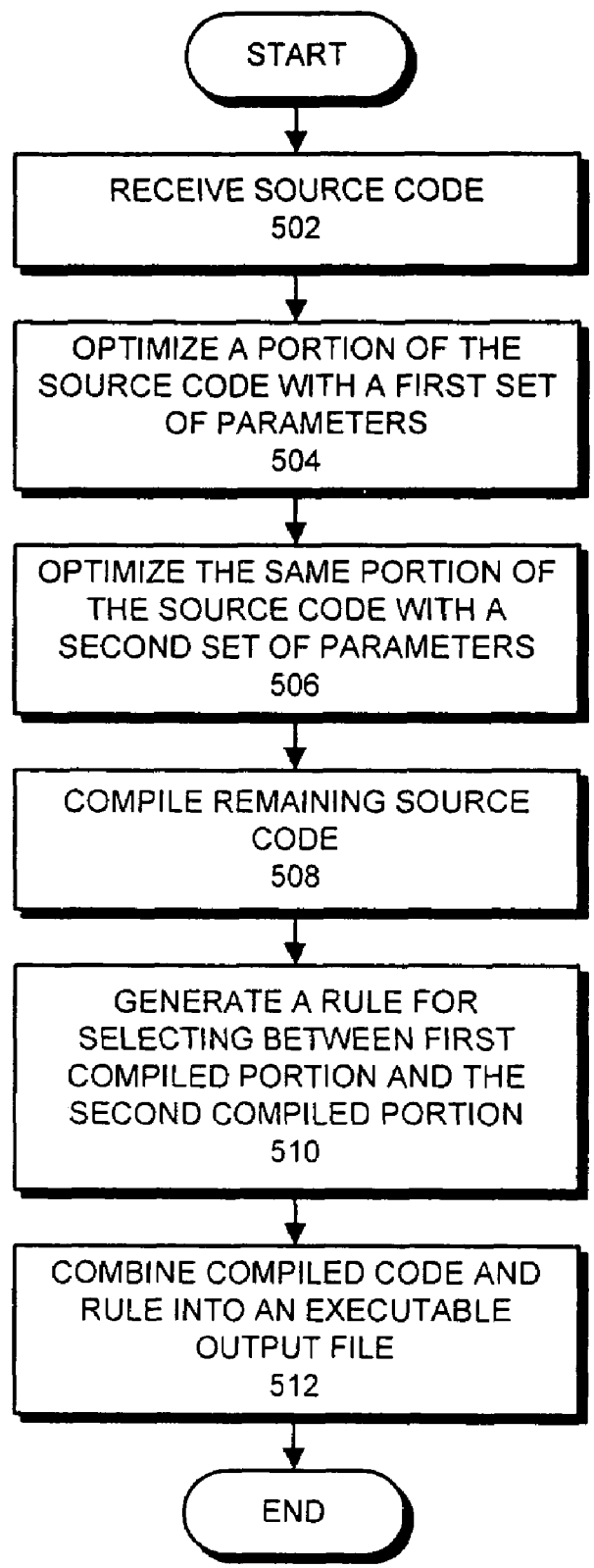
FIG. 5 presents a flowchart illustrating the process of optimizing compiled code in accordance with an embodiment of the present invention.

FIG. 5 presents a flowchart illustrating the process of optimizing compiled code in accordance with an embodiment of the present invention. The system starts when source code is received for compilation (step 502). During the compilation process, the system optimizes a portion of the source code with a first set of optimization parameters (step 504). The system also optimizes the same portion of the source code with a second set of optimization parameters (step 506).

These related sets of parameters can specify optimizations for instruction prefetch and no instruction prefetch, software pipelining and no software pipelining, if-conversions and no if-conversions, or code in-lining and no code in-lining. Other types of optimizations can also be used with the present invention.

After compiling the optimized portions of code, the system compiles the remaining uncompiled code (step 508). Next, the system generates a rule to select between the different optimized portions (step 510). Finally, the system combines the compiled code and the rule into an executable output file (step 512).

Executing Compiled Code

Figure 6:
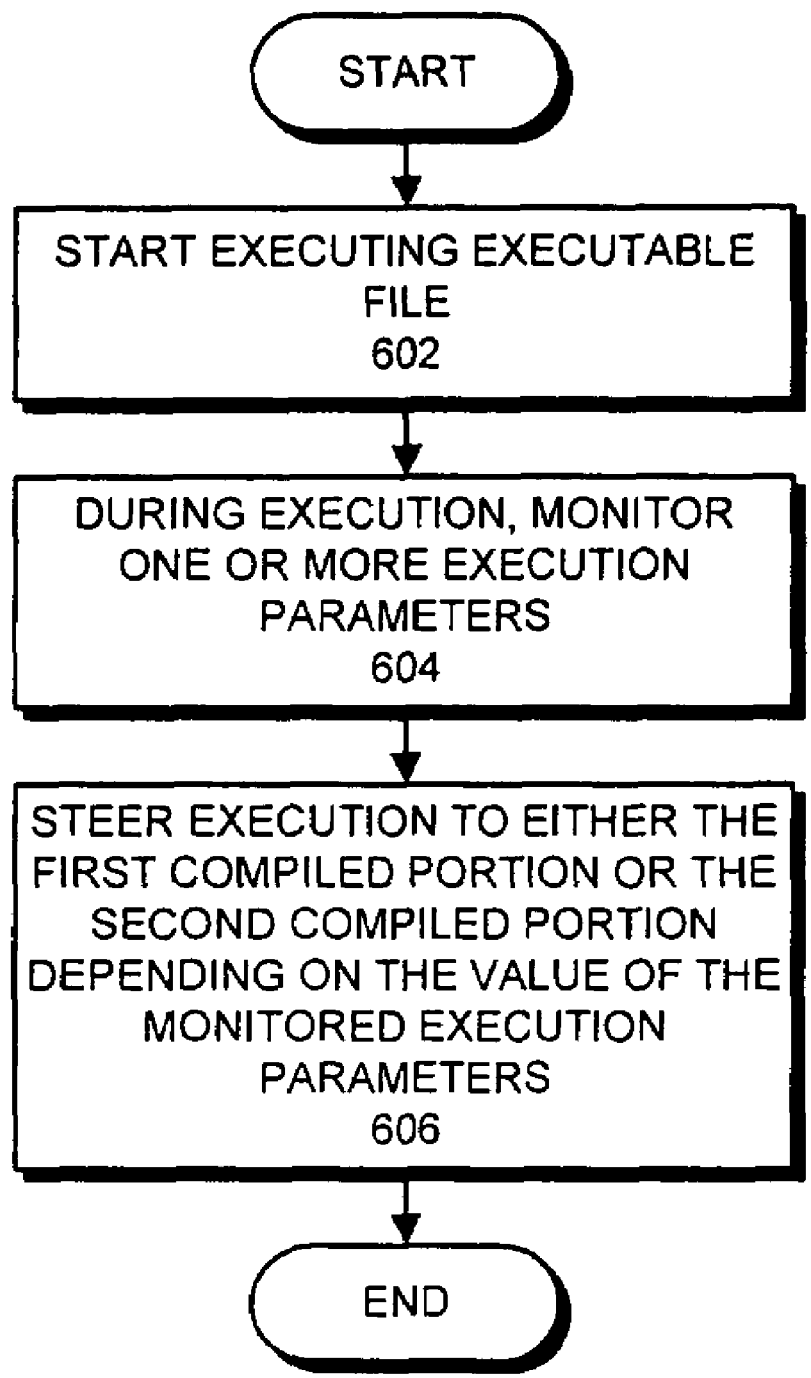
FIG. 6 presents a flowchart illustrating executing optimized code in accordance with an embodiment of the present invention.

FIG. 6 presents a flowchart illustrating the process of executing optimized code in accordance with an embodiment of the present invention. The system starts by executing an executable file (step 602). During execution, a monitoring agent monitors one or more execution parameters (step 604). Based upon the value of the monitored parameters, the system steers execution to either the first compiled portion or the second compiled portion of the executable code (step 606).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing computer program performance by using steered execution, comprising: receiving source code for a computer program; compiling a portion of source code with a first set of optimizations to generate a first compiled portion; compiling the same portion of source code with a second set of optimizations to generate a second compiled portion; compiling remaining source code to generate a third compiled portion, wherein the remaining source code was not compiled with either the first set of optimizations or the second set of optimizations; generating a rule for selecting between the first compiled portion and the second compiled portion; and combining the first compiled portion, the second compiled portion, the third compiled portion, and the rule into an executable output file;

During execution of the executable output file, steering execution between the first compiled portion and the second compiled portion based upon the rule;

Monitoring an execution parameter during execution of the executable output file; and steering execution between the first compiled portion and the second compiled portion based upon the monitored value of the execution parameter.

2. The method of claim 1, wherein the execution parameter includes one of:
a number of clock cycles used;
an instruction count;
a number of cache misses; and
a number of branch mispredictions.

3. The method of claim 1,
wherein the first set of optimizations includes optimizations for cache misses; and
wherein the second set of optimizations includes optimizations for cache hits.

4. The method of claim 3, further comprising:
monitoring cache misses and cache hits; and
steering execution between the first compiled portion and the second compiled portion based upon the number of cache misses and the number of cache hits.

5. The method of claim 1, wherein the rule steers between code that is optimized for:
instruction prefetch and no instruction prefetch;
software pipelining and no software pipelining;
if-conversions and no if-conversions; or
code in-lining and no code in-lining.

6. A computer-readable storage device storing instructions that when executed by a computer cause the computer to perform a method for optimizing computer program performance by using steered execution, wherein the computer-readable storage device does not include computer instruction signals embodied in a transmission medium, and wherein the method comprises: receiving source code for a computer program; compiling a portion of source code with a first set of optimizations to generate a first compiled portion; compiling the same portion of source code with a second set of optimizations to generate a second compiled portion; compiling remaining source code to generate a third compiled portion, wherein the remaining source code was not compiled with either the first set of optimizations or the second set of optimizations; generating a rule for selecting between the first compiled portion and the second compiled portion; and combining the first compiled portion, the second compiled portion, the third compiled portion, and the rule into an executable output file;

During execution of the executable output file, steering execution between the first compiled portion and the second compiled portion based upon the rule;

Monitoring an execution parameter during execution of the executable output file; and steering execution between the first compiled portion and the second compiled portion based upon the monitored value of the execution parameter.

7. The computer-readable storage device of claim 6, wherein the execution parameter includes one of:
a number of clock cycles used;
an instruction count;
a number of cache misses; and
a number of branch mispredictions.

8. The computer-readable storage device of claim 6,
wherein the first set of optimizations includes optimizations for cache misses; and
wherein the second set of optimizations includes optimizations for cache hits.

9. The computer-readable storage device of claim 8, the method further comprising:
- monitoring cache misses and cache hits; and
- steering execution between the first compiled portion and the second compiled portion based upon the number of cache misses and the number of cache hits.

10. The computer-readable storage device of claim 6, wherein the rule differentiates between one of:
- instruction prefetch and no instruction prefetch;
- software pipelining and no software pipelining;
- if-conversions and no if-conversions; or
- code in-lining and no code in-lining.

11. An apparatus for optimizing computer program performance by using steered execution in a computer system, comprising: computer storage device; a receiving mechanism configured to receive source code for a computer program; a compiling mechanism configured to compile a portion of source code with a first set of optimizations to generate a first compiled portion; wherein the compiling mechanism is further configured to compile the portion of source code with a second set of optimizations to generate a second compiled portion; wherein the compiling mechanism is further configured to compile remaining source code to generate a third compiled portion, wherein the remaining source was not compiled with either the first set of optimizations or the second set of optimizations; a generating mechanism configured to generate a rule for selecting between the first compiled portion and the second compiled portion; a combining mechanism configured to combine the first compiled portion, the second compiled portion, the third compiled portion, and the rule into an executable output file;
- During execution of the executable output file, a steering mechanism configured to steer execution between the first compiled portion and the second compiled portion based upon the rule;
- A monitoring mechanism configured to monitor an execution parameter of the executable output file; and a steering mechanism configured to steer execution between the first compiled portion and the second compiled portion based upon the monitored value of the execution parameter.

12. The apparatus of claim 11, wherein the execution parameter includes one of:
- a number of clock cycles used;
- an instruction count;
- a number of cache misses; and
- a number of branch mispredictions.

13. The apparatus of claim 11,
- wherein the first set of optimizations includes optimizations for cache misses; and
- wherein the second set of optimizations includes optimizations for cache hits.

* * * * *